July 13, 1943.   M. J. HERZBERGER   2,324,081
MICROSCOPE OBJECTIVE
Filed Jan. 6, 1941

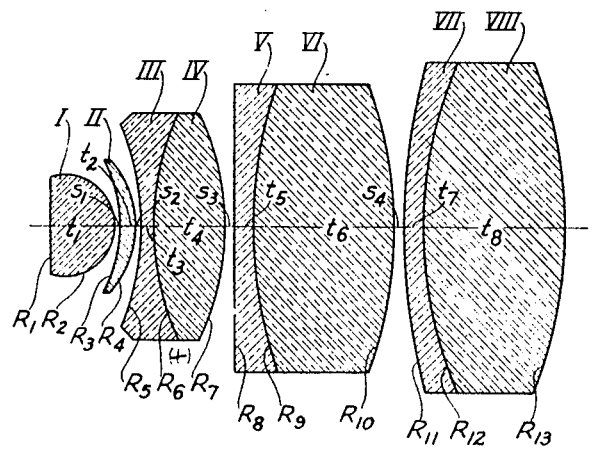

| f=1.00mm. | | N.A.=1.51 | TUBE LENGTH 91mm. | |
|---|---|---|---|---|
| LENS | $N_D$ | $\nu$ | RADII | THICKNESSES |
| I | 1.744 | 45.8 | $R_1 = \infty$ | $t_1 = 0.635$ mm. |
|   |       |      | $R_2 = -0.482$ mm. | $s_1 = 0.006$ mm. |
| II | 1.620 | 60.4 | $R_3 = -1.328$ mm. | $t_2 = 0.150$ mm. |
|    |       |      | $R_4 = -0.914$ mm. | $s_2 = 0.030$ mm. |
| III | 1.617 | 36.6 | $R_5 = -2.428$ mm. | $t_3 = 0.120$ mm. |
| IV | 1.620 | 60.4 | $R_6 = +2.540$ mm. | $t_4 = 0.723$ mm. |
|    |       |      | $R_7 = -2.430$ mm. | $s_3 = 0.060$ mm. |
| V | 1.523 | 50.5 | $R_8 = \infty$ | $t_5 = 0.181$ mm. |
| VI | 1.434 | 95.4 | $R_9 = +4.141$ mm. | $t_6 = 1.420$ mm. |
|    |       |      | $R_{10} = -3.887$ mm. | $s_4 = 0.060$ mm. |
| VII | 1.523 | 50.5 | $R_{11} = +58.55$ mm. | $t_7 = 0.181$ mm. |
| VIII | 1.434 | 95.4 | $R_{12} = +3.870$ mm. | $t_8 = 1.420$ mm. |
|     |       |      | $R_{13} = -4.160$ mm. | |

MAXIMILIAN J. HERZBERGER
INVENTOR

BY *Newton M. Perrins*

ATTORNEY

Patented July 13, 1943

2,324,081

UNITED STATES PATENT OFFICE 2,324,081

MICROSCOPE OBJECTIVE

Maximilian J. Herzberger, Rochester, N. Y., assignor to Eastman Kodak Company, Rochester, N. Y., a corporation of New Jersey Application January 6, 1941, Serial No. 373,271

9 Claims. (Cl. 88—57)

This invention relates to microscope objectives.

It is an object of the invention to provide a microscope objective capable of giving high magnification with good definition, having a reduced amount of coma, capable of covering a relatively large field, and, particularly in the preferred embodiment, with less color and particularly less lateral color than has been previously obtainable.

This improvement is obtained, in a high power microscope objective of the type having a thick, strongly positive front element with its more weakly curved or plane surface in front and separated by a narrow air space from the following components, by the use in the front element of glass having a relatively high index of refraction (of the order of 1.75) and a relatively low dispersion (high nu value) for glass of such high refraction. Suitable glass for this purpose is described in the application Serial No. 284,041 Eberlin and De Paolis, filed July 12, 1939.

In the highest power objectives, the front element is relatively thick, the thickness being of the order of magnitude of the focal length of the objective, that is between one half and three halves of such focal length, and is also strongly positive, that is having a focal length of the same order of magnitude as its thickness, i. e. between one half and three halves the focal length of the objective as a whole. The invention is also applicable to somewhat weaker power microscopes wherein the front element is both slightly thinner and slightly weaker than this preferred range.

In the design of such microscope objectives, the effect of varying the first element has rarely been investigated very far. There has been some tendency (see U. S. 2,050,024, Sonnefeld) to use a glass of as low index as is convenient. According to the present invention on the other hand, this front element is made of glass having an index of refraction between 1.7 and 2. This results in much reduced coma and thus permits higher magnifications and gives better field. If this high index front element is of crown glass and is combined with a hyperchromatic component, preferably a doublet fairly close to the front element, there is much less lateral color than in previous systems.

Following this hyperchromatic doublet in the system, it is preferable to have at least one doublet with its positive element made of fluorite which has low refractive index and low dispersion, i. e. high dispersive index. It is also a preferred embodiment of the invention to include between the front element and the hyperchromatic doublet a meniscus element concave to the front with its rear surface aplanatic.

The advantages of oil immersion can be applied to my invention in the same way as with ordinary microscopes. When the front element has an index of 1.74 according to the invention, I have found that methylene iodide is a suitable "oil."

In the accompanying drawing there is shown a preferred embodiment of the invention.

The specifications of the lens shown in the drawing as as follows:

F=1.00 mm.   N. A.=1.51   Tube length 91 mm.

| Lens | $N_D$ | ν | Radii | Thicknesses |
|---|---|---|---|---|
| I | 1.744 | 45.8 | $R_1= \infty$ | $t_1= .635$ mm. |
|   |       |      | $R_2= -.482$ mm. | $S_1= .006$ |
| II | 1.620 | 60.4 | $R_3= -1.328$ | $t_2= .150$ |
|    |       |      | $R_4= -.914$ | $S_2= .030$ |
| III | 1.617 | 36.6 | $R_5= -2.428$ | $t_3= .120$ |
| IV | 1.620 | 60.4 | $R_6= +2.540$ | $t_4= .723$ |
|    |       |      | $R_7= -2.430$ | $S_3= .060$ |
| V | 1.523 | 50.5 | $R_8= \infty$ | $t_5= .181$ |
| VI | 1.434 | 95.4 | $R_9= +4.141$ | $t_6=1.420$ |
|    |       |      | $R_{10}= -3.887$ | $S_4= .060$ |
| VII | 1.523 | 50.5 | $R_{11}= +58.55$ | $t_7= .181$ |
| VIII | 1.434 | 95.4 | $R_{12}= +3.870$ | $t_8=1.420$ |
|     |       |      | $R_{13}= -4.160$ |   |

Such a microscope may be conveniently manufactured at about 2 mm. focal length, the radii and thicknesses being correspondingly doubled.

In the example shown element I is the first component, element II the meniscus element above referred to, and elements III and IV form the hyperchromatic doublet. Elements VI and VIII are made of fluorite.

It is to be understood that while I have described a specific example, the invention is applicable to all types of microscopic objectives wherein the front element has a strongly convex rear surface and the front surface is plano or a weakly curved surface; and I consider my invention as including all such modifications and equivalents as fairly fall within the scope of the appended claims.

What I claim and desire to secure by Letters Patent of the United States is:

1. A microscope objective comprising a plurality of positive components in alignment of which the first one is a positive element whose index of refraction is between 1.7 and 2.0 and whose dispersive index is between 40 and 60, said positive element having both a thickness and a focal length between one-half and three-halves the focal length of the objective as a whole.

2. A microscope objective according to claim 1 in which there is included near the first component a hyperchromatic doublet.

3. A microscope objective according to claim 1 in which said first element has an index of refraction about 1.74 and the first surface thereof is immersed in methylene iodide.

4. A microscope objective including a first strongly positive component with an index of refraction between 1.7 and 2.0 and with a dispersive index between 40 and 60, a hyperchromatic doublet near the first component and at least one doublet with its positive element of fluorite behind the hyperchromatic doublet.

5. A microscope objective according to claim 4 in which a positive meniscus element with its rear surface aplanatic is included between the first component and the hyperchromatic doublet.

6. A microscope objective corrected particularly for coma and lateral color having a front strongly positive element made of glass having a refractive index between 1.70 and 1.75 and a dispersive index of nu value between 45 and 50, and a plurality of closely spaced color correcting cemented doublets behind said front element, the front doublet being hyperchromatic, and a meniscus element between the front element and the hyperchromatic doublet, said meniscus element being concave to the front and having a rear aplanatic surface.

7. A microscopic objective corrected for coma and lateral color having a front strongly positive element the front surface of which is much weaker than the rear surface, the thickness of which is of the order of magnitude of the focal length of the objective, and made of glass having a refractive index between 1.70 and 1.75 and a nu value between 45 and 50, and a plurality of closely spaced color correcting cemented doublets behind said front element, the front doublet being separated from the said front element by a distance less than either the thickness of said front element or the focal length of the objective.

8. A microscope objective corrected for coma and lateral color of the type having a front strongly positive element the thickness of which is of the same order of magnitude as the focal length of the objective and having color correcting cemented doublets behind such front element, the front one of such doublets being separated from said front element by a distance less than the focal length of the objective as a whole, the said front positive element being made of glass having an index of refraction between 1.70 and 1.75 and a nu value between 45 and 50.

9. A microscope objective having substantially the following specifications:

| Lens | $N_D$ | $\nu$ | Radii | Thicknesses |
|---|---|---|---|---|
| I | 1.74 | 46 | $R_1 = \infty$ | $t_1 = .64\ f$ |
|  |  |  | $R_2 = -\ .45\ f$ | $S_1 = .006\ f$ |
| II | 1.62 | 60 | $R_3 = -\ 1.33\ f$ | $t_2 = .15\ f$ |
|  |  |  | $R_4 = -\ .91\ f$ | $S_2 = .03\ f$ |
| III | 1.62 | 37 | $R_5 = -\ 2.43\ f$ | $t_3 = .12\ f$ |
| IV | 1.62 | 60 | $R_6 = +\ 2.54\ f$ | $t_4 = .72\ f$ |
|  |  |  | $R_7 = -\ 2.43\ f$ | $S_3 = .06\ f$ |
| V | 1.52 | 51 | $R_8 = \infty$ | $t_5 = .18\ f$ |
| VI | 1.43 | 95 | $R_9 = +\ 4.14\ f$ | $t_6 = 1.4\ f$ |
|  |  |  | $R_{10} = -\ 3.89\ f$ | $S_4 = .06\ f$ |
| VII | 1.52 | 51 | $R_{11} = +58.6\ f$ | $t_7 = .18\ f$ |
| VIII | 1.43 | 95 | $R_{12} = +\ 3.87\ f$ | $t_8 = 1.4\ f$ |
|  |  |  | $R_{13} = -\ 4.16\ f$ |  | where the first column gives the lens elements in roman numerals in order from front to rear and indicates air spaces by dashes and where $f$ is the focal length of the objective, $N_D$ is the index of refraction for the D line of the spectrum, $\nu$ is the dispersive index, R, $t$ and S, refer respectively to the radii of curvature of the refractive surfaces, the thicknesses of the elements, and the air space between the elements, the subscripts on these refer to the surfaces, the elements and the spaces numbered consecutively from the front and the $+$ and $-$ signs in the fourth column correspond to surfaces which are respectively convex and concave to the front.

MAXIMILIAN J. HERZBERGER.